Aug. 11, 1970  INTERFEROMETER SYSTEM FOR DISTANCE MEASUREMENT  3,523,735

Filed Oct. 7, 1966

INVENTOR.
JACK ELDON TAYLOR

BY

United States Patent Office 3,523,735
Patented Aug. 11, 1970

3,523,735
INTERFEROMETER SYSTEM FOR
DISTANCE MEASUREMENT
Jack Eldon Taylor, Monroe, N.Y., assignor to General
Dynamics Corporation, a corporation of Delaware
Filed Oct. 7, 1966, Ser. No. 585,116
Int. Cl. G01b 9/02
U.S. Cl. 356—106                    8 Claims

ABSTRACT OF THE DISCLOSURE

A laser interferometer is described for measuring very small distances, such as exist between the layers of a thin film microcircuit. The laser beam is modulated so as to provide a reference beam and a signal beam which are of different frequency and are offset spacially with respect to each other. The signal beam and the reference beam are projected upon the microcircuit and are reflected therefrom along substantially the same path. Because the beams are optically shifted during modulation, the reference beam and the signal beam will be reflected from layers on the microcircuit which are separated by the distance to be measured. A detection system which operates by heterodyning the beams provides an electrical output which indicates the distance to be measured.

---

Figure 1:
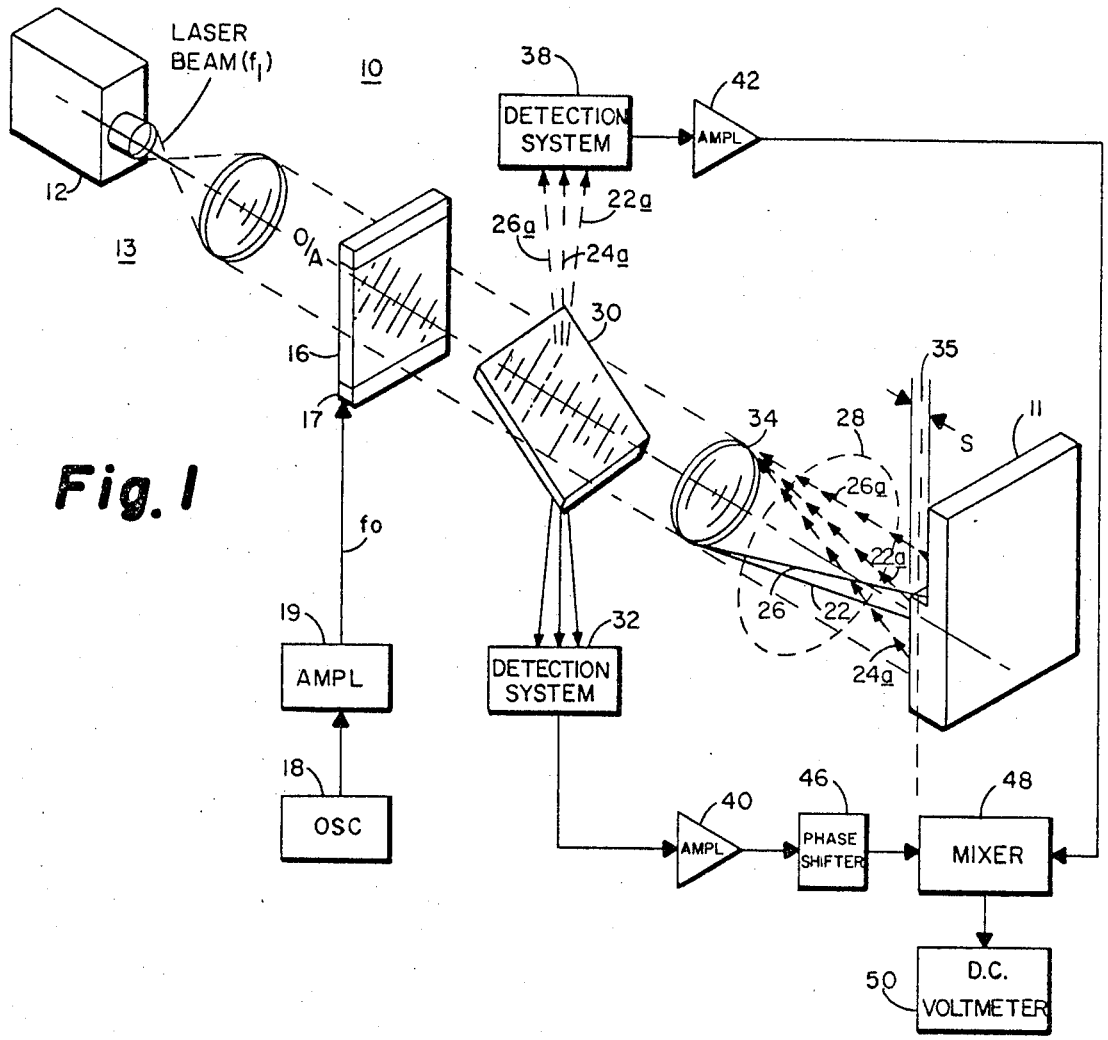

The present invention relates to interferometer systems, and particularly to an improved laser interferometer system.

The invention is especially useful in an instrument for measuring minute thickness dimensions as exist in microelectronic circuitry. Such circuits include integrated circuits of the thin film type.

A known type of laser interferometer system (the so-called Twyman-Green type) operates on the basis of comparing the difference in phase between two laser beams propagated along different paths; namely, a signal laser beam having phase information representative of a physical dimension, and a reference laser beam. The phase difference between the two signals then is a measure of the difference in distances traveled by the two beams.

One difficult problem in such interferometers is the basic one of extracting, in an accurate fashion, the phase information. Another is that the signal laser beam in its travel towards an object having a dimension which is to be measured may have its phase interfered with due to a local turbulence or vibration (e.g. atmospheric), so that when the signal beam is compared with the reference beam which was propagated along a different path, inaccuracies will result in the phase measurement.

It is an object of the present invention to provide an improved laser illuminated interferometer system in which the above-indicated problems are substantially eliminated.

A further object of the invention is to provide an improved interferometer system which is adapted to provide highly accurate measurements.

A still further object of this invention is to provide an improved interferometer system which, while simple in construction, can nevertheless measure the phase differences between laser beams with a high degree of accuracy.

Briefly described, an exemplary interferometer system embodying the invention includes means for modulating a laser beam in a manner in which it divides it into components which differ from each other both spacially (in direction) and temporally (in frequency). The phase of one of these spectral components, which may be considered to be the signal laser beam, is varied to contain information corresponding to a dimension to be measured. One of the other components may be considered to be the reference beam. In order to extract the phase information from these beams, a "cat's eye" technique is employed. In this connection, after the phase of the signal beam has been altered, both signal and reference beams are reflected back over substantially the same path to where they originated. With such an arrangement, the noise found in prior art laser beam signals caused by disturbance or variations in the medium through which the signal beam passes tends to be canceled out (viz. both beams are subjected to substantially the same perturbations, thereby insuring a purer signal). The reference beam and signal beam components are then heterodyned with each other so as to derive a signal having a certain frequency but shifted in phase relative to a derivable reference signal due to the difference in the distance traveled by the beams. This phase shift is then measured to determine this distance.

Figure 2:
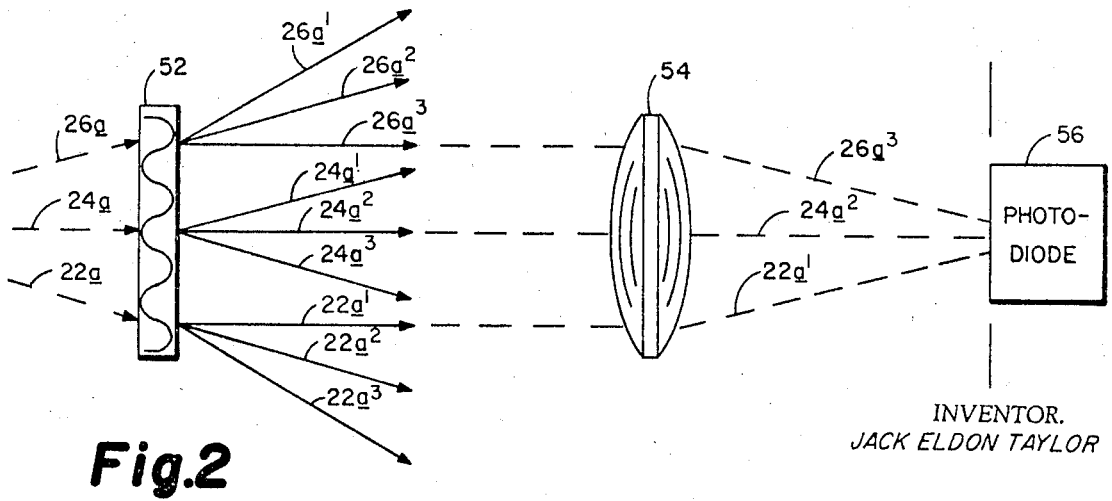

The invention itself, both as to its organization and method of operation, as well as additional objects and advantages thereof will become more readily apparent from a reading of the following description in connection with the accompanying drawings in which:

FIG. 1 is a diagrammatic illustration, partly in block form, illustrating an exemplary interferometer system in accordance with the present invention, and FIG. 2 is a diagrammatic illustration of a portion of the system of FIG. 1.

As shown, a representative interferometer system 10 is one which is especially adapted for use in measuring very small dimensions, such as that of the step S found on an etched thin film 11 of an integrated circuit. Once such a measure is known, it can be used as a basis for determining the electrical properties of that portion of the integrated circuit.

Within the system 10 there is disposed a conventional source of a laser beam, shown for convenience as a block 12 which directs the laser beam up to focusing and collimating lens system 13 arranged to project the monochromatic light to a diffraction modulator 15. The modulator 15 includes a rectangular slab 16, formed of an isotropic homogeneous medium, such as for example quartz, and a transducer 17 bonded to the bottom surface of the medium 15. It may be desirable to terminate the end of the slab 16 opposite to the transducer with vibration absorbing material to preclude reflection. Ultrasonic stress waves, of a frequency designated $f_0$ which may be in the radio frequency range, say of about 10 mc./s., are introduced into the quartz medium by means of the transducer 17. These waves travel generally in a direction which is perpendicular to the optical axis (labeled O/A) of the lens system 13. In order to generate these ultrasonic waves, the system 10 includes a highly stable sine wave oscillator 18, operating at the frequency $f_0$ and an amplifier 19 which couples the signal ($f_0$) the transducer 17.

As is well known, the traveling stress waves within the crystal 15 will produce a diffraction grating and cause the light from the lens system 13 to vary both in phase (viz temporarily) and in angle (viz spacially). The operation of ultrasonic diffraction cells like the cell illustrated is discussed in greater detail in the text, Born and Wolf, Principals of Optics, Pergamon Press (1959).

Only three optical beam components 22, 24 and 26 emerging from the modulator 15 are used in this embodiment. For a specific example by way of illustration, the undiffracted 22 may have an optical frequency $f_1$, the natural laser beam optical frequency; the first order sum diffracted component 24 which is at the sum frequency of $f_1+f_0$; and the first order difference diffracted component 26 at a frequency $(f_1-f_0)$. More particularly, the three components 22, 24, and 26 emerging from the modulator 15 may respectively be written in the following form:

$$E_0 \cos 2\pi f_1 t, E_1 \cos 2\pi (f_1+f_0)t, E_2 \cos 2\pi (f_1-f_0)t$$

Although other beam components may be produced, they are not used in the system 10 and may be eliminated by convenient means such as a mask 28 disposed relatively close to and just in front of the thin film 11. For this embodiment, only the beam components 24 and 26 are required in the practice of the invention and beam 22 may effectively be removed in an electrical detection system 38 to be described hereinafter. Accordingly, the beam 26 may be considered to be the signal beam and the beam 24 the reference beam.

After leaving the ultrasonic diffraction cell, all three components initially encounter a half silvered mirror 30, which directs a portion of each of them to a heterodyning system 32 used for coherent detection or development of an electronic signal having information representative of the distance S. What remains of the components 22, 24 and 26 is directed to a lens 34, which focuses them (as shown) upon the thin film 11 having the dimension (S) which is to be measured. Preferably, the object 11 is disposed at the focal plane of the lens 34, as shown by the dotted line 35. Inasmuch as the diffraction angle between the reference and signal beams 26 and 24 is relatively small, these two components traverse substantially the same path in their travel from the modulator 15 to the object 11 and on to the detection system 38 and so will be subject to the same perturbation as mentioned above.

In effect, the film 11 acts as a reflector and in combination with the lens 34 forms a "cat's eye" retroreflective system which provides an inversion effect and turns the signal beam back upon itself. For the sake of clarity of understanding, the reflected paths of the three components (shown in dotted lines) are labeled 22a, 24a and 26a, respectively. Thus, as shown, the reflected signal beam components 22a, 24a, and 26a pass back through the lens 34 and on to the beam-splitting mirror 30, which then directs components 22a, 24a, and 26a to a second detector system 38.

As the component 26 traverses the length of the step S, the dimension of which is to be measured, its phase is delayed by the additional length traversed 2(S), which may be readily expressed by the equation:

$$\Delta\phi = 2\pi \frac{2S}{\lambda}$$

wherein $\Delta\phi$ is the phase angle which is measured in radians that the component 26 suffers while traversing the additional distance 2(S), and $\lambda$ is the wave length of the component 22.

Stated another way, when the three reflected beam components 22a, 24a and 26a are directed to the detector system 38, the component 26a will be lagging the component 24a in phase by an angle equal to $\Delta\phi$ and will take the following form, $$E_2 \cos [2\pi(f_1-f_0)t - \Delta\phi]$$

while the component 24a (viz. the reflected reference beam) will be of the form, $$E_1 \cos [2\pi(f_1+f_0)t]$$

Each of the detecting systems 32 and 38 performs a similar function; namely, firstly combining or superposing each of the three spectral components which may be accomplished by a grating optical system described hereinafter, and secondly heterodyning these combined components to produce a plurality of electrical output signals, each having a distinctly different phase angle. The heterodyning function may be accomplished by any number of well known square law detecting type apparatus, such as for instance, a high speed photo diode.

A number of different techniques may be used to superpose the spectral components. One such system is shown in FIG. 2 which comprises a fixed grating 52, which preferably is of sine wave configuration having its spacial frequency (lines/millimeter) proportional to that of the modulator 15 so that for each input spectral component, the modulator will develop three output beams all having the same optical frequency as the components from which they were derived. Referring more particularly to the component 26a, which upon leaving the grating 52 is split into three spectral components $26a^1$, $26a^2$ and $26a^3$. The other components 22a and 24a are acted upon by the grated 52 in a similar fashion. A lens system 54 then selects the parallel components $22a^1$, $24a^2$ and $26a^3$ and focuses these components upon a heterodyning photo diode 56. Inasmuch as the system 32 also operates in a similar fashion, it need not be discussed. Accordingly, the detecting system 32 will produce electrical outputs of the following forms:

$$k_1(E_0^2+E_1^2+E_2^2), k_2E_0E_1 \cos 2\pi f_0 t,$$
$$-k_3E_0E_2 \cos 2\pi f_0 t, k_4E_1E_2 \cos 4\pi f_0 t$$

Only the signal $K_4E_1E_2 \cos 4\pi f_0 t$ is to be used and so it is extracted and amplified by means of a tuned amplifier 40.

In a similar manner only the output signal of the system 38

$$k_4{}^1E_1{}^1E_2{}^1 \cos (4\pi f_0 t + \Delta\phi)$$

is of interest and so it is extracted by means of a tuned amplifier 42. Thereafter the output signal of the amplifier 40 is directed to conventional phase shifting circuitry 46 which will be described hereinafter. An output signal from the phase shifter 46 is delivered to a mixing circuit 48. The other input to the mixing circuit is provided by the tuned amplifier 42. Preferably, the mixing circuitry 48 is of a balanced design, and yields a series of output signals, only the one which is a direct current (DC) signal of the form:

$$E_{max} \text{ sine } \Delta\phi$$

In operation of the system, the film 11 which has a relatively flat surface is initially placed at the focal plane of the lens 34 so that it rebects all three signals 22a, 24a, 26a from the same plane. By adjusting the amplitude of the tuned amplifier 40 and the phase shifting circuit 46, the output from the mixer 46 which may be measured by a DC voltmeter 50 can be set to some minimum level, say zero volts. Thereafter, by optically shifting the beams upwardly so that the step reflects the signal 26a, an output amplitude will be detected. Now, this output which is a function of $\Delta\phi$ is reduced to zero by means of adjusting the phase shifter 46. By measuring the number of radians needed to make this adjustment, a very highly accurate measurement can be determined which can then be correlated in terms of the length of the step S by rearranging and substitution in Equation 1.

So for example, for a $\lambda$ equal to 6328 angstrom units, a variations in $\Delta\phi$ equal to .12 electrical degrees will correspond to the physical dimension S of about 1 angstrom unit.

From the foregoing description it will be apparent that there has been provided an improved laser beam interferometer system which may take a variety of forms. For example, although the system has been described as employing traveling stress waves in crystal 15, other arrangements using standing waves will also suggest themselves to those skilled in the art. Still further, it will be clear that a system could be designed in accordance with this invention wherein the detector 32 is replaced by a structure which is responsive directly to the signal ($f_0$) and generates an electrical reference at $2(f_0)$. Accordingly, the foregoing description should be taken merely as illustrative and not in any limiting sense.

What is claimed is:

1. An interferometer system which measures the phase difference between the two light beams, which is a function of the distance between two spaced reflective surfaces comprising (a) a source of monochromatic light,
 (b) means for diffracting said monochromatic light to provide a plurality of components which differ spacially and temporally from each other, a first and second of said components providing said two beams, (c) focusing means for directing said first beam onto one of said surfaces and said second beam onto the said other surfaces and transmitting said first and second beams after the reflection thereof from said surfaces, (d) detecting means responsive to said reflected first and second beams for forming output electrical signals corresponding to the modulation product thereof, and (e) means responsive to said electrical signals for determining the phase shift of said first beam with respect to said second beam, said phase shift being a function of said distance between said surfaces.

2. The invention as set forth in claim 1, wherein said monochromatic light source is a laser.

3. The invention as set forth in claim 1, wherein said diffracting means includes an ultrasonic diffraction cell including means for propagating a stress wave of high frequency therethrough.

4. The invention as set forth in claim 1 wherein said focusing means includes a lens which directs said first beam onto said one surface and said second beam onto said other surface.

5. The invention as set forth in claim 1 wherein said detecting means includes means for combining said reflected beams translating said combined beams into electrical signals, heterodyning said electrical signals to provide a plurality of output electrical signals and selecting one of said output electrical signals of a certain frequency.

6. The invention as set forth in claim 5 wherein said combining, translating, heterodyning and selecting means includes means for developing an electrical reference signal which is integrally related to the frequency of said stress wave.

7. The invention as set forth in claim 1, wherein said focusing means includes means provided between said diffracting means and said spaced surfaces for partially reflecting said plurality of components to form an electrical reference signal and partially transmitting said plurality of components to provide a signal beam.

8. The invention as set forth in claim 7 wherein said partially reflecting means is operative to reflect said reflected first and second beams onto the means set forth in sub-paragraph (d) of claim 1.

References Cited

UNITED STATES PATENTS

| | | | |
|---|---|---|---|
| 3,170,122 | 2/1965 | Bennett | 331—94.5 |
| 3,256,443 | 6/1966 | Moore | 250—199 |

RONALD L. WIBERT, Primary Examiner

C. CLARK, Assistant Examiner